US008951330B2

(12) United States Patent
Lin et al.

(10) Patent No.: US 8,951,330 B2
(45) Date of Patent: Feb. 10, 2015

(54) METHOD FOR PREPARING SILVER NANOPARTICLES BY EMPLOYING ETHANOLAMINE AND POLY(STYRENE-CO-MALEIC ANHYDRIDE) COPOLYMERS

(75) Inventors: Jiang-Jen Lin, Taipei (TW); Wei-Cheng Tsai, Taipei (TW); Chao-Po Hsu, Taipei (TW); Wei-Li Lin, Taipei (TW); Yueh-Hsien Wu, Taipei (TW)

(73) Assignee: National Taiwan University, Taipei (TW)

( * ) Notice: Subject to any disclaimer, the term of this patent is extended or adjusted under 35 U.S.C. 154(b) by 340 days.

(21) Appl. No.: 13/549,417

(22) Filed: Jul. 14, 2012

(65) Prior Publication Data

US 2012/0279352 A1    Nov. 8, 2012

Related U.S. Application Data

(62) Division of application No. 12/836,762, filed on Jul. 15, 2010, now Pat. No. 8,491,699.

(30) Foreign Application Priority Data

Jul. 16, 2009   (TW) .............................. 98124156 A

(51) Int. Cl.
*B22F 9/24* (2006.01)
*B22F 1/00* (2006.01)
*B82Y 30/00* (2011.01)

(52) U.S. Cl.
CPC ................. *B22F 9/24* (2013.01); *B22F 1/0018* (2013.01); *B82Y 30/00* (2013.01); *Y10S 977/896* (2013.01)
USPC ............................... 75/371; 75/721; 977/896

(58) Field of Classification Search
None
See application file for complete search history.

(56) References Cited

U.S. PATENT DOCUMENTS

| | | | |
|---|---|---|---|
| 8,318,844 B2* | 11/2012 | Lin et al. ......................... 524/439 |
| 8,491,699 B2* | 7/2013 | Lin et al. ........................... 75/371 |
| 2011/0296950 A1* | 12/2011 | Buscall et al. ................... 75/370 |
| 2014/0220366 A1* | 8/2014 | Wang et al. ..................... 428/457 |

* cited by examiner

*Primary Examiner* — George Wyszomierski
(74) *Attorney, Agent, or Firm* — Pai Patent & Trademark Law Firm; Chao-Chang David Pai

(57) ABSTRACT

The present invention provides a method for producing silver nanoparticles by employing ethanolamine. The method of this invention can be easily operated and no organic solvent is required. Ethanolamine first reacts with copolymers of poly (styrene-co-maleic anhydride) (abbreviated as SMA) to generate polymeric polymers. The polymeric polymers then reduce silver ions to silver atoms which are dispersed in the form of silver nanoparticles. Functional groups of the polymeric polymers can chelate with silver ions and be stably compatible with water or organic solvents, whereby the silver nanoparticles can be stably dispersed without aggregation and the produced silver nanoparticles.

6 Claims, 4 Drawing Sheets

METHOD FOR PREPARING SILVER NANOPARTICLES BY EMPLOYING ETHANOLAMINE AND POLY(STYRENE-CO-MALEIC ANHYDRIDE) COPOLYMERS

CROSS REFERENCE TO RELATED APPLICATIONS

The present application is a division of prior U.S. application Ser. No. 12/836,762 filed Jul. 15, 2010, entitled "METHOD FOR PREPARING SILVER NANOPARTICLES BY EMPLOYING ETHANOLAMINE", now issued as U.S. Pat. No. 8,491,699. The prior U.S. Application claims priority of Taiwan Patent Application No. 098124156, filed on Jul. 16, 2009, the entirety of which is incorporated herein by reference.

BACKGROUND OF THE INVENTION

1. Field of the Invention

The present invention relates to a method for preparing silver nanoparticles, and particularly to a method for preparing silver nanoparticles employing ethanolamine.

2. Related Prior Arts

So far, methods for producing silver nanoparticles are classified into physical methods and chemical methods. The physical method usually demands expensive equipment for highly-vacuum vaporization or e-beam. The chemical method uses reducers to reduce the silver ions to atoms and then a stabilizer is used to control the size of the particles. Representative reducers include $NaBH_4$, formaldehyde, alcohol, hydrazine ($H_2N-NH_2$) and the like. Representative stabilizers include sodium citrate, glucose, sodium dodecyl sulfate, polyvinyl pyrrolidone (PVP), dendrimer, and the like.

To avoid aggregation and promote the stability of the silver nanoparticles, dispersants or protectors are usually added based on their static electricity or steric hindrance. The dispersants can be water soluble polymers, for example, polyvinylpyrrolidone (PVP), polyvinylalcohol (PVA), polymethylvinylether, poly(acrylic acid) (PAA), nonionic surfactants, chelating agents, etc.

Some stabilizers known in the art are disclosed in reports. In J. Phys. Chem. B 1998, 102, 10663-10666, sodium polyacrylateor polyacrylamide was provided as a stabilizer. In Chem. Mater. 2005, 17, 4630-4635, thioalkylated poly(ethylene glycol) was provided as a stabilizer. In J. Phys. Chem. B 1999, 103, 9533-9539, sodium citrate was provided as a stabilizer. In Langmuir 1996, 12, 3585-3589, nonionic surfactants were provided as stabilizers. In Langmuir 1997, 13, 1481-1485, NaBH4 was provided as a reducing agent and anionic, cationic, and nonionic surfactant were provided as stabilizers. In Langmuir 1999, 15, 948-951, 3-aminopropyl-trimethoxysilane (APS) was provided as a stabilizer and N,N-dimethyl-formamide was used as a reducing agent.

As described above, the traditional method for stabilizing silver particles is to add surfactants or stabilizers. However, the solutions of such silver particles have solid contents less than 10% and have a higher solid content with aggregation.

Conventional chemical methods require the use of organic solvents, salts, or reducing agents for long-term and complex redox reactions, which result in high cost. Moreover, concentrations of the silver ions have to be lowered to ppm scale during operation or the silver particles will aggregate and perform undesired effects. Accordingly, there remains a need for developing more efficient and cost effective methods for preparing silver nanoparticles.

SUMMARY OF THE INVENTION

The object of the present invention is to provide a method for preparing silver nanoparticles employing ethanolamine, which is simpler than the conventional processes and does not require organic solvents. Additionally, the generated silver particles can be uniformly and stably dispersed at nanoscale without aggregation in high concentrations.

In the present invention, ethanolamine reacts with a mixture of (poly(oxyalkylene)-amine)/epoxy or poly(styrene-co-maleic anhydride) copolymers (SMA) to generate polymeric polymers, which further react with silver ions to reduce the silver ions to silver and disperse the silver as silver nanoparticles. Ethanolamine has a general formula: $(HOCH_2CH_2)_{3-z}N(R)_z$, wherein z=0, 1, or 2, and R=H, alkyl, or alkenyl of C1 to C18, such as methyl, ethyl, or cyclohexyl. Examples of ethanolamine include monoethanolamine, diethanolamine, triethanolamine, (±)-1-Amino-2-propanol (MPA), diglycolamine (DGA), and $N^1,N^1$-dimethyl1-1,3-propanediamine (DAP).

In the reaction of ethanolamine and poly(oxyalkylene)-amine/epoxy, the reaction temperature ranges from approximately 100° C. to 150° C. (preferably from 110° C. to 130° C.), and the reaction time is about 5 to 10 hours. In the reaction of polymeric polymers and silver ions, the reaction temperature ranges from about 15° C. to 35° C. (preferably from 20° C. to 30° C.), and the reaction time is about 12 to 36 hours. Poly(oxyalkylene)-amine can be poly(oxyalkylene)-monoamine, poly(oxyalkylene)-diamine, or poly(oxyalkylene)-triamine. Epoxy is preferably diepoxides, for example, diglycidyl ether of Bisphenol-A or 3,4-epoxycyclohexyl-methyl-3,4-epoxycyclohexane carboxylate.

In the above reactions, the molar ratio of epoxy to the amine group of ethanolamine preferably ranges from 1/3 to 3/1. The molar ratio of the amine group of poly(oxyalkylene)-amine to the amine group of ethanolamine preferably ranges from 1/5 to 5. The silver ions can be provided from $AgNO_3$, and the weight ratio of polymeric polymers/$AgNO_3$ preferably ranges from 1/99 to 99/1.

In the reaction of ethanolamine and SMA/epoxy, the reaction temperature ranges from about 20° C. to 30° C., and the reaction time is about 3 to 6 hours. In the reaction of polymeric polymers and silver ions, the reaction temperature ranges from about 50° C. to 100° C. (preferably in an oil bath from 70° C. to 90° C.), and the reaction time is about 5 to 24 hours.

In the above reactions, when the molar ratio of SMA to the amine group of ethanolamine preferably ranges from 1/10 to 2/1 and the silver ions is provided from $AgNO_3$, the weight ratio of polymeric polymers/$AgNO_3$ preferably ranges from 1/99 to 99/1.

DETAILED DESCRIPTION OF THE PREFERRED EMBODIMENTS

The method of the present invention primarily includes two steps: (A) reacting ethanolamine and a mixture of poly(oxyalkylene)-amine/epoxy or SMA to synthesize polymeric polymers; and (B) reducing silver ions with the polymeric polymers to generate silver nanoparticles.

Ethanolamine of the present invention has a general formula: $(HOCH_2CH_2)_{3-z}N(R)z$, wherein z=0, 1, or 2, and R=H, alkyl, or alkenyl of C1 to C18, such as methyl, ethyl or cyclohexyl. Examples and structural formula of ethanolamine are shown in ATTACHMENT 1.

Epoxy has the following structural formula:

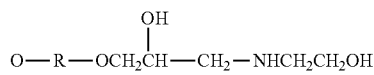

The preferred examples of epoxy are shown in ATTACHMENT 2. Examples of SMA are as follows:

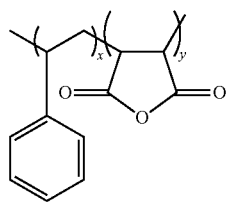

|  | approx. ratio | approx. Mw |
| --- | --- | --- |
| SMA 1000 | x/y = 1/1 | 6000 |
| SMA 2000 | x/y = 2/1 | 6000 |
| SMA 3000 | x/y = 3/1 | 6000 |
| SMA 6000 | x/y = 6/1 | 120000 |
| SMA 11000 | x/y = 11/1 | 140000 |

Poly(oxyalkylene)-amine includes poly(oxyalkylene)-diamine, poly(oxyalkylene)-monoamine, and poly(oxyalkylene)-amine having several poly(oxyethylene) segments, which can be purchased from Huntsman Chemical Co. or Aldrich Chemical Co.

Poly(oxyethylene)-monoamine has a general formula of R—$NH_2$, and the structural formula is:

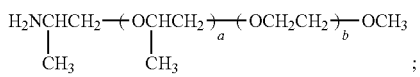

wherein a=0 to 10, and b=10 to 50.

For example, Jeffamine® M-2070 has a molecular weight of approximately 2000, and a=10 and b=31 in the above formula.

Poly(oxyethylene)-diamine has a general formula of $H_2N$—R—$NH_2$, and the structural formula is:

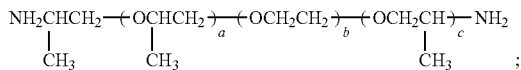

wherein a=10 to 50, and b or c=0 to 10.

For example, Jeffamine® ED-2003 has a molecular weight of approximately 2000, includes oxyethylene (EO) and oxypropylene (PO) segments, and a+c=6 and b=39 in the above formula.

Other examples of poly(oxyalkylene)-amine are shown in ATTACHMENT 3.

In the following detailed description, the silver ions were provided from $AgNO_3$ (99.8 wt %) purchased from Aldrich Co. However, other silver salts such as AgI, AgBr, AgCl, and silver pentafluoropropionate are also suitable.

Detailed procedures are described as follows:

Example 1

Step (A): Synthesizing the Polymeric Polymer BE188/ED2001/MEA

Figure 1:
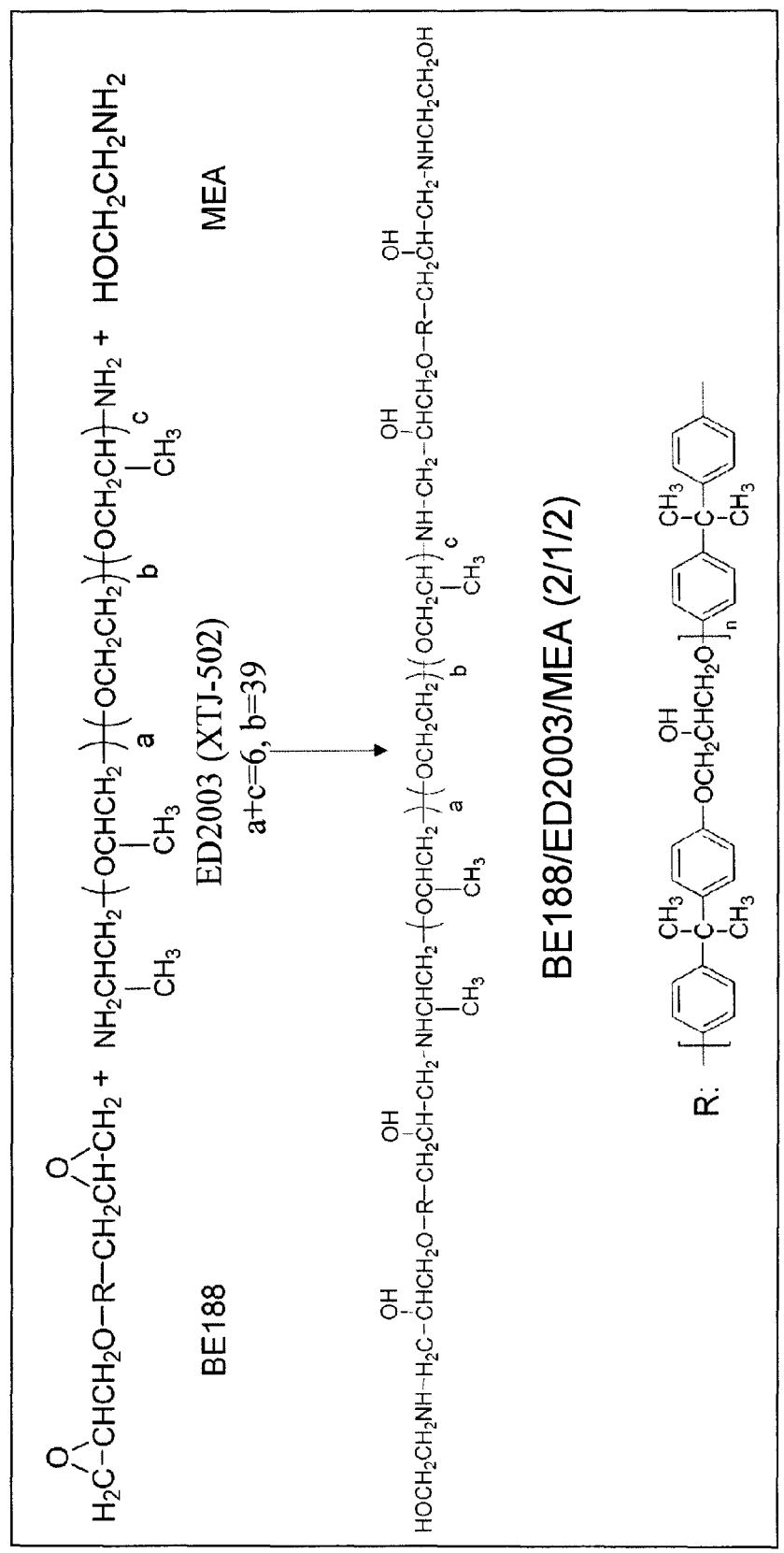
FIG. 1 shows the reaction of ethanolamine, poly(oxyalkylene)-amine, and epoxy.

ED2001 was dewatered in vacuum at 120° C. for 6 hours. In a 500 ml three-necked bottle, diglycidyl ether of bisphenol A (BE188) (7 g, 0.02 mol), ED2001 (40 g, 0.02 mol) and MEA (1.22 g, 0.02 mol) were added so that the molar ratio of BE188/ED2001/MEA was 1/1/1. The mixture was mechanically mixed and reacted in nitrogen at 120° C. for more than 5 hours. The mixture was sampled at intervals for IR analysis until the characteristic peak of the epoxy group disappeared on FT-IR spectrum. After the reaction completed, the product, a light yellow viscous liquid, was observed. FIG. 1 shows the reaction.

Step (B): Synthesizing Silver Nanoparticles

BE188/ED2001/MEA (0.2 g) was dissolved in water (10 g) in a three-necked bottle. $AgNO_3$ (0.05 g) was mixed and reacted at room temperature for one day and the solution became black. The UV analysis showed that the silver nanoparticles were generated according to characteristic absorption thereof at wavelength 430 nm.

Examples 2 to 3

Repeat procedures of Example 1, except that the molar ratio of BE188/ED2003/MEA was changed to 2/1/2 and 3/1/3, respectively. The silver nanoparticles having good thermal stability in a high concentration were prepared.

Example 4

Repeat procedures of Example 1, except that MEA was changed to DEA. The silver nanoparticles having good thermal stability in a high concentration were prepared.

Examples 5 to 6

Repeat procedures of Example 4, except that the molar ratio of BE188/ED2003/DEA was changed to 2/1/2 and 3/1/3, respectively. The silver nanoparticles having good thermal stability in a high concentration were prepared.

Examples 7 to 8

Repeat procedures of Example 1, except that MEA was changed to DGA and DAP, respectively. The silver nanoparticles having good thermal stability in a high concentration were prepared.

Example 9

Step (A): Synthesizing the Polymeric Polymer SMA/MEA

Figure 2:
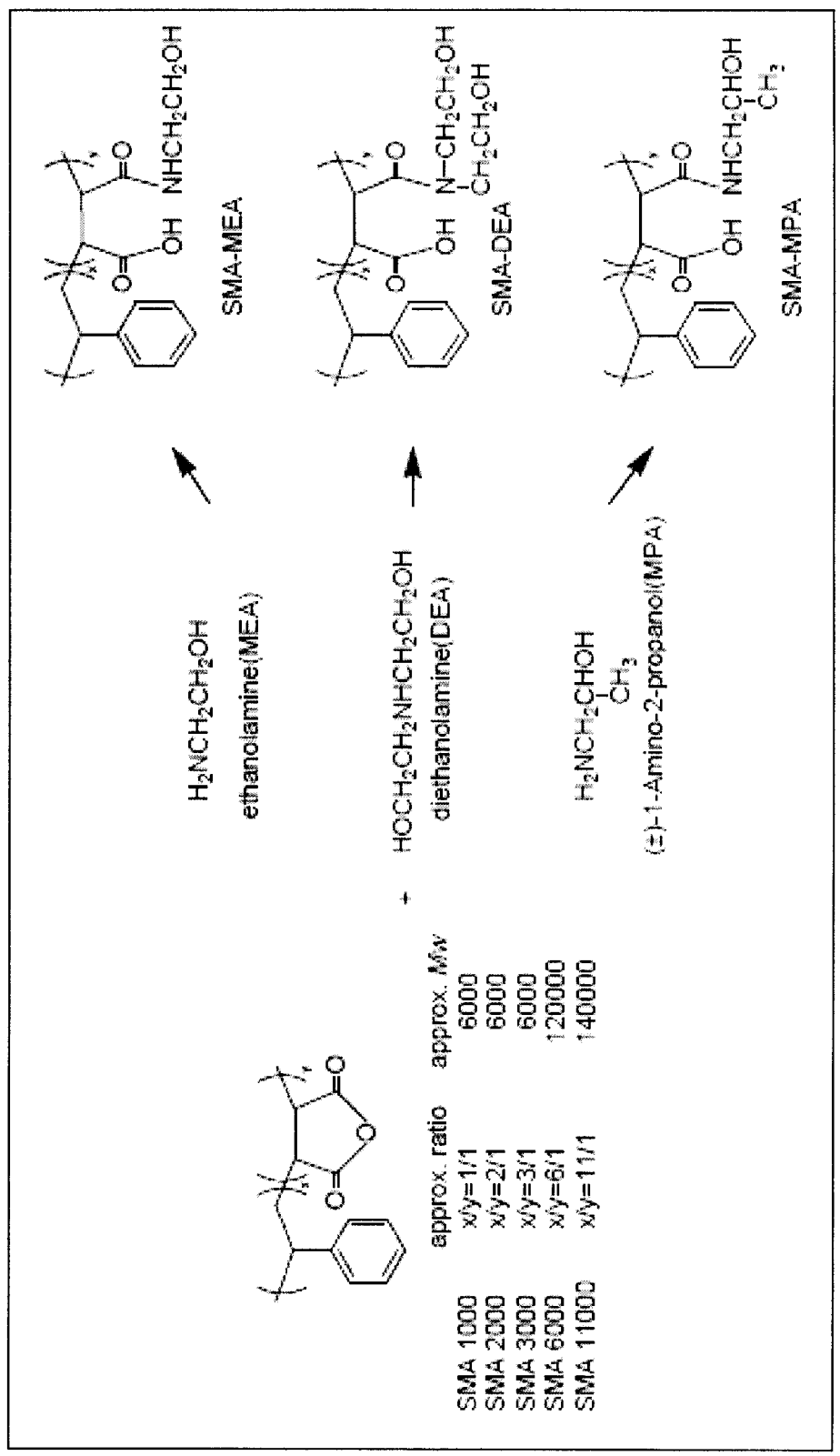
FIG. 2 shows the reaction of ethanolamine and SMA.

SMA and MEA were dewatered in vacuum at 120° C. for 6 hours and subsequently dissolved in tetrahydrofurane (THF). Next, MEA (5.2 g, 85.6 mmol) was placed in a three-necked bottle, and SMA1000 (10.0 g, including 42.8 mmol MA, dissolved in 50 mL THF) was added therein by several batches to avoid cross-linking. The reaction time was 3 to 6 hours. The synthesized polymer SMA/MEA was insoluble in THF. By vacuum filtration, the polymer was separated from THF and excess MEA. The reaction is shown in FIG. 2. SMA/MEA was then dissolved in different solvents and the result showed the best compatibility in water, ethanol as the next, and insolubility in toluene, methyl ethyl ketone (MEK), acetone, and isopropyl alcohol (IPA).

Step (B): Synthesizing Silver Nanoparticles

In a round-bottom flask, SMA/MEA (0.015 g) was dissolved in water (50 g) and stirred with a magnetic stirrer. $AgNO_3$ (0.005 g) was then added for preparing silver nanoparticles through a reductive reaction in an oil bath at 80° C. for 5 hours. With increasing concentration of the silver nanoparticles, the solution became brown from light yellow. The UV analysis showed that the silver nanoparticles were generated according to characteristic absorption thereof at wavelength 425 nm.

Examples 10 to 12

Figure 3:
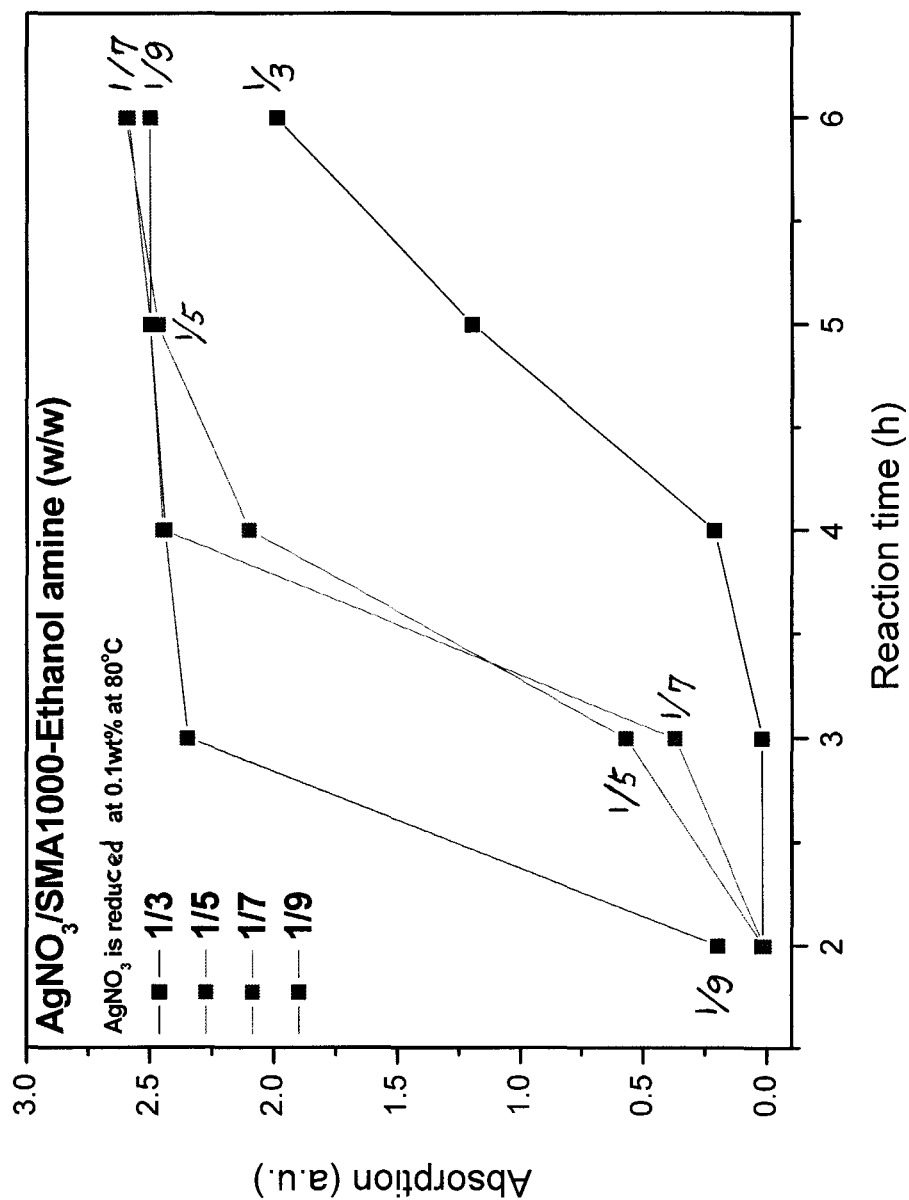
FIG. 3 shows the relationships between UV absorbance to reaction time for SMA/MEA of different ratios.

Repeat procedures of Example 9, except that the weight ratio of $AgNO_3$ to dispersant SMA/MEA of step (B) was changed as 1/5, 1/7 and 1/9, respectively. With UV analysis, the relationship of the amounts of the dispersants to reaction time is shown FIG. 3 in which the weight ratio of $AgNO_3$ to the dispersant SMA/MEA did not changed with UV absorption. That is, the reductive reaction completed after 5 hours. If the amounts of the dispersant increased, the reaction time decreased.

Examples 13 to 14

Repeat procedures of Example 9, except that MEA was changed as DEA and MPA, respectively. The silver nanoparticles having good thermal stability in a high concentration were prepared.

Comparative Example 1

Step (A): Synthesizing PMDA/ED2001/MEA

In a 100 ml three-necked bottle, ED2001 (10 g, 0.005 mol) was added and dissolved in THF (10 ml). PMDA (2.18 g, 0.01 mol) was then added so that the molar ratio of PMDA/ED2003/MEA was 2/1/2. By mechanically blending, the reaction was performed in nitrogen below 30° C. for at least 2 hours. The mixture was sampled at intervals for IR analysis until the characteristic peak of the amide group disappeared on FT-IR spectrum. After the reaction completed, MEA (0.61 g, 0.01 mol) was added and peak of the anhydride functional group disappeared.

Figure 4:
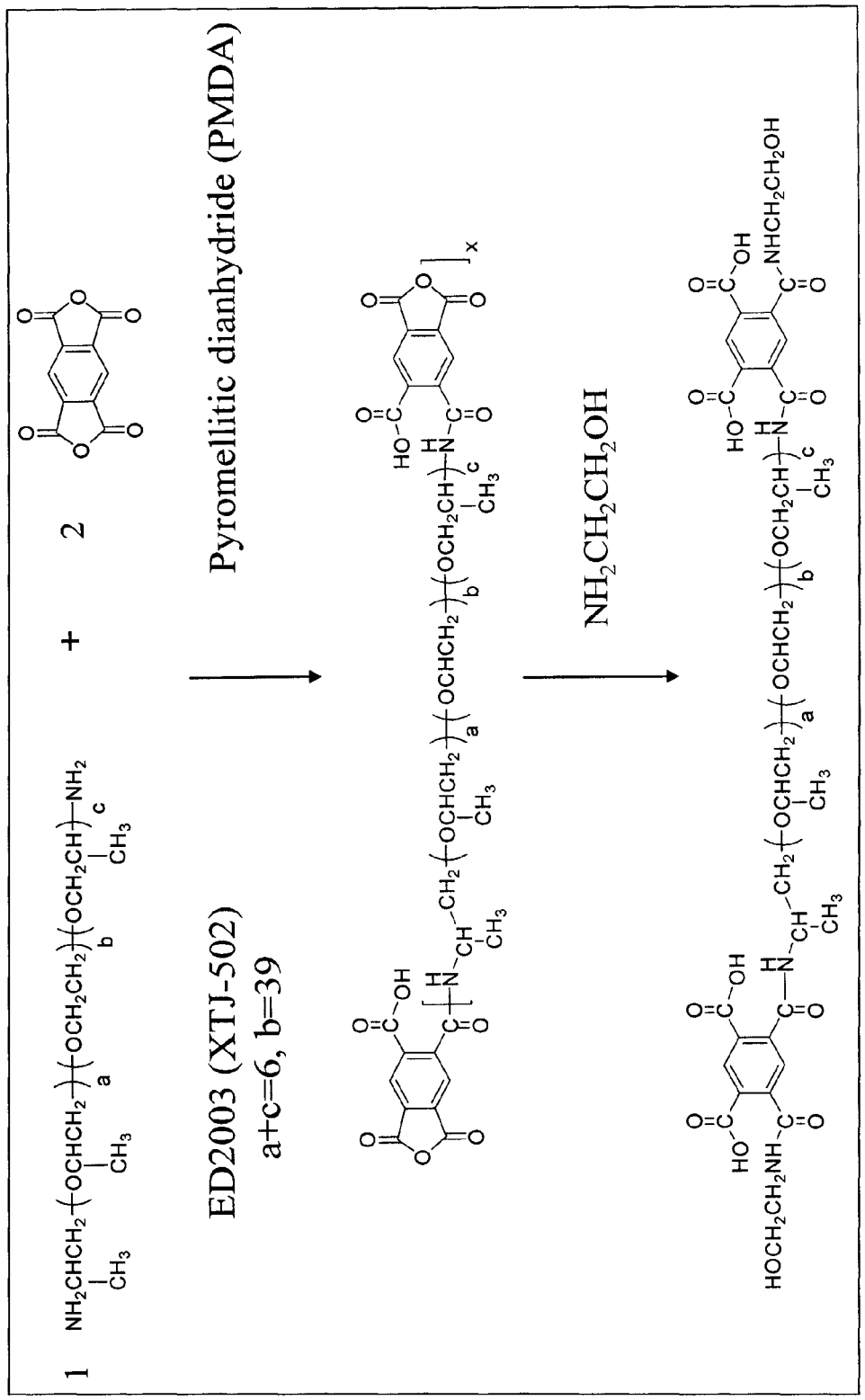
FIG. 4 shows the reaction of ethanolamine, poly(oxyalkylene)-amine, and PMDA.

After removing THF with vacuum concentration, the product, a milk white viscous precipitate, was obtained. FIG. 4 shows the reaction.

Step (B)

Repeat step (B) of Example 1, except that BE188/ED2001/MEA was replaced with PMDA/ED2003/MEA. As a result, the silver ions were stable but could not be reduced into silver nanoparticles unless strong reducing agents such as $NaBH_4$, was added. Thus, the stablizers synthesized according to the present invention were necessary.

Comparative Example 2

Repeat procedures of Example 1, except that BE188/MEA was synthesized in step (A) and replaced BE188/ED2003/MEA in step (B). Finally, the dispersant was not soluble in water.

Comparative Example 3

Repeat procedures of Example 1, except that BE188/ED2003 was synthesized in step (A) and replaced BE188/ED2001/MEA in step (B). Finally, a significant amount of silver particles settle down on the bottom of the bottle. Thus, the stablizers synthesized according to the present invention were necessary.

Comparative Example 4

Repeat step (B) of Example 1, except that BE188/ED2003/MEA was replaced with ED2003. Finally, the silver particles aggregated.

Operation conditions of the above Examples and Comparative Examples were listed in ATTACHMENT 4.

Preparing the Concentrative Dispersions of the Silver Nanoparticles

After being stabilized with polymeric polyamines of the present invention, the silver nanoparticles could be further concentrated by a water-jet concentrator or a freezing dryer to achieve silver paste, silver gel, or silver powders having concentrations at least 10 wt %, even more than 30 wt %.

According to the above description, features of the present invention are summarized as follows:

1. The polymeric polymers can act as both a reducing agent and a stabilizer (or dispersant) in preparing the silver nanoparticles because functional groups thereof, for example, carboxylic acid, multi-amine, amide, and hydroxyl group, can chelate with silver ions.
2. The molar ratios of polymeric polymers (dispersant) to silver particles can be controlled to limit the silver particles at nanoscale, generally about 100 nm, and even smaller than 10 nm.
3. The silver nanoparticles can be uniformly and stably dispersed in much higher concentrations than the commercial silver products and can be further concentrated to form a silver paste which can be dispersed in a medium again. The medium can be a hydrophilic solvent such as water or a hydrophobic organic solvent such as methanol, ethanol, IPA, acetone, THF, MEK, toluene, and the like.
4. The silver nanoparticles can be blended in organic polymers at nanoscale to form composites of good electrical conductivity or germproof effects. The organic polymers can be polyimide (PI), epoxy, nylon, polypropylene (PP), acrylonitrile butadiene styrene (ABS), polystyrene (PS), and the like.

What is claimed is:

1. A method for preparing silver nanoparticles employing ethanolamine, comprising the steps of:
    (A) reacting (i) a first compound having a general formula $(HOCH_2CH_2)_{3-z}N(R)_z$, wherein z=0, 1, or 2, and R=H, alkyl, or alkenyl of C1 to C18 and (ii) poly(styrene-co-maleic anhydride) copolymers (SMA) at 20° C. to 30° C. for 3 to 6 hours to generate a polymeric polymer; and (B) reacting the polymeric polymers with silver ions at 50° C. to 100° C. for 5 to 24 hours to reduce the silver ions into silver atoms and disperse the silver atoms as silver nanoparticles (AgNp).

2. The method of claim 1, wherein R in the first compound is selected from the group consisting of methyl, ethyl and cyclohexyl.

3. The method of claim 1, wherein the first compound is selected from the group consisting of monoethanolamine, diethanolamine, triethanolamine, (±)-1-Amino-2-propanol (MPA), diglycolamine (DGA) and $N^1,N^1$-dimethyl-1,3-propanediamine (DAP).

4. The method of claim 1, wherein the molar ratio of SMA to the amine group of the first compound ranges from 1/10 to 2/1.

5. The method of claim 1, wherein the silver ions are provided from $AgNO_3$, and the weight ratio of polymeric polymers/$AgNO_3$ ranges from 1/99 to 99/1.

6. The method of claim 1, wherein step (B) is performed in an oil bath at 70° C. to 90° C.

\* \* \* \* \*